Aug. 23, 1960     L. A. KNOX     2,950,052
ANALOGUE-TO-DIGITAL PRECISION INTEGRATOR
Filed Dec. 29, 1954                                    2 Sheets-Sheet 1

INVENTOR.
Lewis A. Knox
BY

INVENTOR.
Lewis A. Knox
BY

United States Patent Office 2,950,052
Patented Aug. 23, 1960

2,950,052

ANALOGUE-TO-DIGITAL PRECISION INTEGRATOR

Lewis A. Knox, Owego, N.Y., assignor to International Business Machines Corporation, New York, N.Y., a corporation of New York Filed Dec. 29, 1954, Ser. No. 478,471

6 Claims. (Cl. 235—154)

This invention relates to apparatus for converting an analogue voltage-to-digital information, and more particularly to the use of capacitor switching in integration of an analogue-to-digital information.

It is an object of this invention to provide a device which will precisely integrate an analogue voltage to provide a pulse output which represents the time integral of the analogue voltage.

It is another object of this invention to provide an analogue integrator having capacitor switching by electronic means.

A further object of this invention is the provision of a means of integration which is relatively unaffected by changes of input voltage magnitude and rates of change of input voltage and by change of frequency and temperature with resulting improved accuracy.

Still another object of this invention is to provide means of capacitor switching in an integrator having a linear charging rate.

These and other objects of this invention will become apparent upon consideration of the following description, taken together with the accompanying drawings, in which.

In general, this invention provides the integration of an analogue voltage by capacitor switching which produces a pulse output with each switching to indicate a prescribed unit value of the integral. The exact integral is indicated by a digital portion and an analogue portion comprising the total count of pulses together with the value of the analogue output voltage of the integrator. In using the device of this invention with an analogue voltage input representing velocity, each pulse may indicate a specified unit distance such as one mile and a count of the pulses per unit of time then indicates the velocity.

Figure 1:
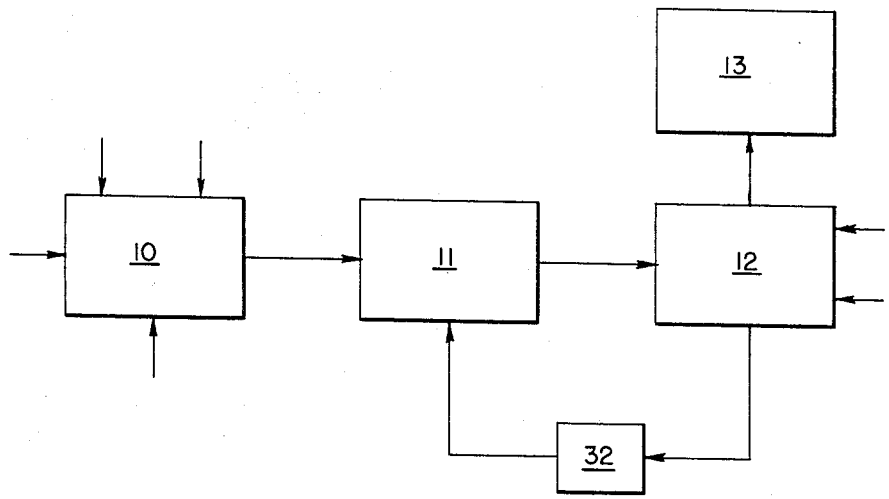
Figure 1 is a block diagram of the analogue voltage integrator of this invention.

Referring specifically to the figures, Fig. 1 shows a block diagram setting forth the major section of the integrator. An A.C. to D.C. converter 10 receives the analogue A.C. input signal, an alternating reference voltage and a direct reference voltage $E_R$. The D.C. output from the converter is fed to a D.C. integrator 11 which employs capacitor switching. The integrated output voltage of the D.C. integrator 11 is fed to an amplitude comparator 12 which develops a pulse output to operate a digital counter 13 to count in either direction according to whether these developed output pulses have, at any given time, positive or negative pulse polarity.

The A.C. to D.C. converter 10 acts to produce a D.C. output which is proportional to the amplitude of an A.C. input and which has a polarity related to the relative phase of the latter.

Figure 2:
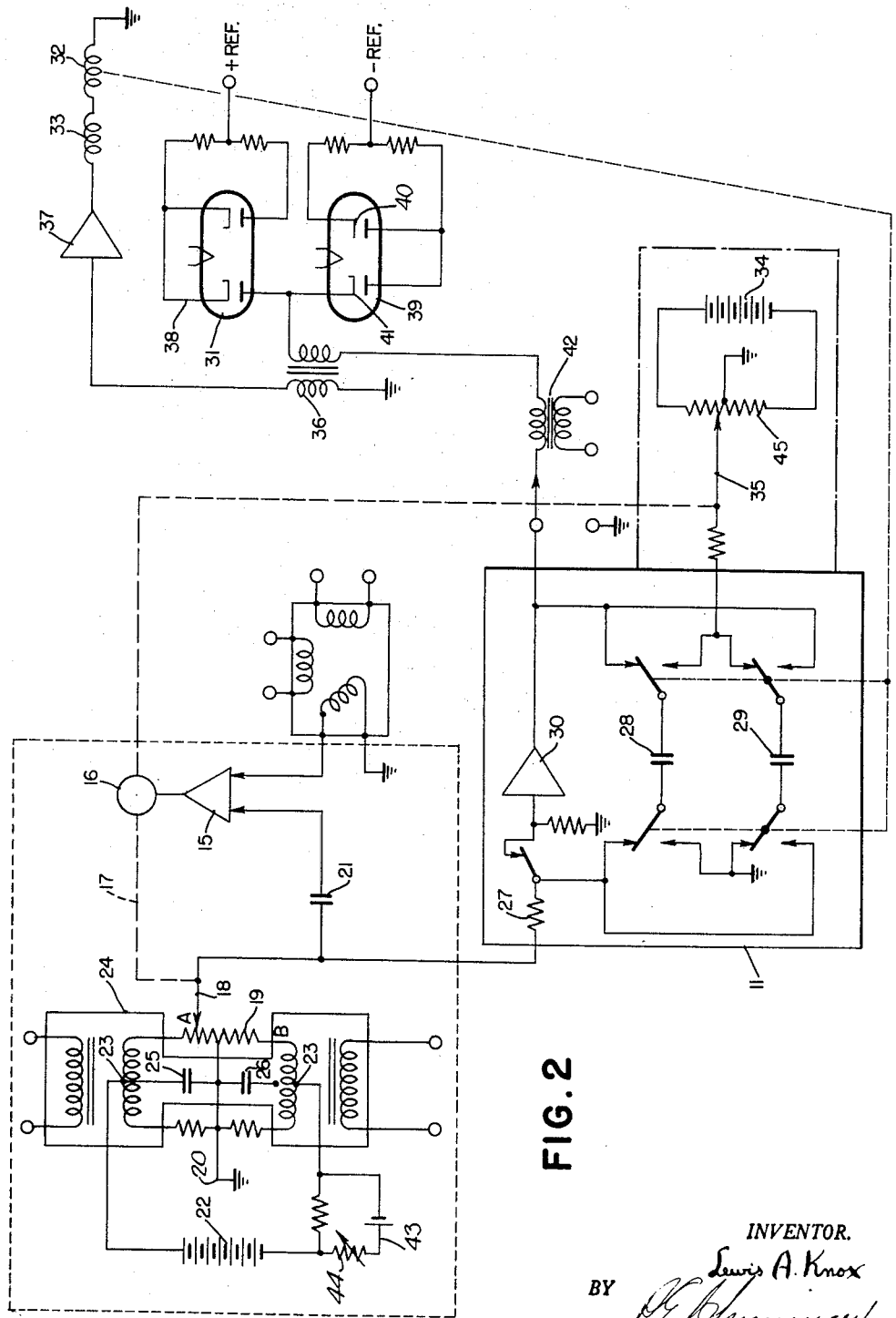
Fig. 2 is a schematic diagram of the analogue voltage integrator showing an A.C. to D.C. converter, a D.C. integrator with capacitor switching, and amplitude comparator, and a switching transfer-time compensation means.

Referring to Fig. 2, a schematic layout of the A.C. to D.C. converter is shown within the dotted lines. Alternating signal voltages are fed into a summing-amplifier 15 to energize a servo motor 16 which turns a shaft 17 to position a wiper arm 18 of a potentiometer 19. The potentiometer 19 is center tapped to ground at 20 to provide balanced A.C. voltages having a phase A on one half and a phase B on the other half. The 400 cycles per second voltages in the phase A and B of the potentiometer 19 are 180° out of phase with each other. The wiper arm 18 positioned by the motor 16 picks off alternating voltage from the potentiometer 19 and feeds it back to the summing amplifier 15 through a condenser 21. The wiper arm 18 chooses between the voltages of phase A and phase B of the potentiometer 19 and selects the phase which is out of phase with the input analogue signal voltage being fed into the summing amplifier 15. The pick off voltage conducted from the potentiometer 19 by the wiper arm 18 when fed into the summing amplifier opposes the analogue signal voltage which is also fed into the summing amplifier 15. The purpose of the servo-loop containing the amplifier 15 and the motor 16 in combination with the potentiometer 19 and the wiper arm 18 is to provide equal amplitude and phase opposed voltages in the summing amplifier 15, so that the servo-motor receives zero current from the summing amplifier 15 and the servo-loop can be considered to be in balance. The wiper arm 18 accordingly moves across the potentiometer 19 under the drive of the motor 16. Assuming the wiper arm starts at the center tap 20, and that the motor 16 is under the influence of a steady analogue signal voltage, the wiper arm 18 will be moved across the half of the potentiometer which is carrying the phase opposing the phase of the signal voltage. The wiper arm moving across the potentiometer takes from the potentiometer a voltage which increases as the wiper arm 18 moves away from the center tap 20. By means of the action of the summing amplifier 15 in matching the opposing voltages as mentioned above, the servo-motor 16 will cease to receive an operating current from the amplifier 15 when the voltage picked off the potentiometer 19 by the wiper arm 18 matches the input signal voltage in the summing amplifier 15. At this point, the signal voltage is balanced out by the pick-up voltage and the servo-motor stops rotating, leaving the wiper arm 18 positioned on the potentiometer 19, displaced from the center tap 20 to the extent necessary in obtaining a voltage which will match the input signal voltage.

The wiper arm 18 remains stationary in its position on the potentiometer and the matching alternating voltage impressed on the summing amplifier 15 from the potentiometer 19 remains constant as long as the input signal voltage is unchanged. Change of the input signal voltage subsequent to the fixing of the position of the wiper arm results in a repositioning of the wiper arm as a result of the consequent unbalance of the matching of voltages in the amplifier 15 with a resultant potential on the motor 16. The subsequent change of the input voltage may be either an increase or a decrease in amplitude and even a reversal in phase. The motor 16 will automatically be driven by the resultant potential from the unbalance of the amplifier 15 and will move the wiper arm 18 in whichever direction is necessary to change the pick-off voltage from the potentiometer 19 to match the varied input signal voltage in the summing amplifier 15.

The matching pick-off alternating voltage picked off the potentiometer 19 by the wiper arm 18 is a portion of the total potential impressed upon the potentiometer 19. The A.C. to D.C. converter 10 provides a means for taking a value of direct voltage from the potentiometer 19 which is proportional to a total direct potential in the same ratio as the matching pick-off alternating voltage is to the total alternating voltage on the potentiometer 19. A source 22 of direct voltage is connected across the potentiometer 19 by attachment of the two sides of the potential source 22 to respective center taps 23 of two secondary windings of a transformer 24 which provide the A.C. excitation voltage to the potentiometer 19.

The direct voltage source 22 is connected to the center taps 23, so that the direct current load is equal on both sides of the circuit of the potentiometer 19 and the transformer 24. Consequently, a direct voltage $E_V$ is developed across the potentiometer along with the alternating voltage produced by the transformer 24. The potentiometer 19, wiper arm 18 picks off an alternating voltage as well as a proportional value of the value of direct voltage $E_V$. The direct potential picked off the potentiometer 19 is in the same ratio to the total direct potential on the potentiometer 19 as the pick off matching voltage bears to the alternating voltage on the potentiometer 19. Therefore, the pick off direct voltage from the potentiometer 19 is determined by and proportional to the amplitude of the signal input voltage on the summing amplifier 15 and the polarity of the pick off direct voltage with respect to the ground point 20 is related to the relative phase of the signal voltage.

The matching pick off alternating voltage is combined with the pick off direct voltage to provide a unidirectional current which has a varying A.C. component impressed on it. The A.C. variation does not affect the operation of integrating the direct current as the time for one cycle of the A.C. variation is negligible in comparison to the integration time, as will be explained more fully below. The D.C. output from the potentiometer 19 is isolated from the servoloop of the amplifier 15 by the condenser 21. A pair of condensers 25 and 26 are provided between the center taps 23 to provide a low impedance A.C. circuit for exciting potentiometer 19.

The D.C. integrator 11 is the portion of the apparatus of this invention within the solid line on the schematic diagram of Fig. 2. The D.C. output from the potentiometer 19 is integrated by a resistance 27 and a pair of condensers 28 and 29. As described above, this output is the proportional direct voltage carrying with it and having impressed thereon a matching pick off alternating voltage.

Curve A shows the exponential charging rate of a simple R-C integrator; curve B shows the linear charging rate obtained by the addition of an amplifier; curve C shows the performance of the present invention with correction for switching time and curve D shows the performance of the complete integrator.

The condensers 28 and 29 are a matched pair which are alternately charged to provide the integration of the input voltage into output pulses of voltage. Each of these condensers 28 and 29 operate in the integration in the same manner and successively. The maximum amplifier voltage swing would limit the value of the integral if only one capacitor were used. Therefore, to continue the integration a second capacitor is employed and is caused alternately to become charged and discharged and then to charge over again. The alternate charge and discharge of alternate condensers 28 and 29 is accomplished by switching means described in greater detail below. The curves C of Fig. 3 show the successive, alternate charging and discharging of the condensers 28 and 29.

Figure 3:
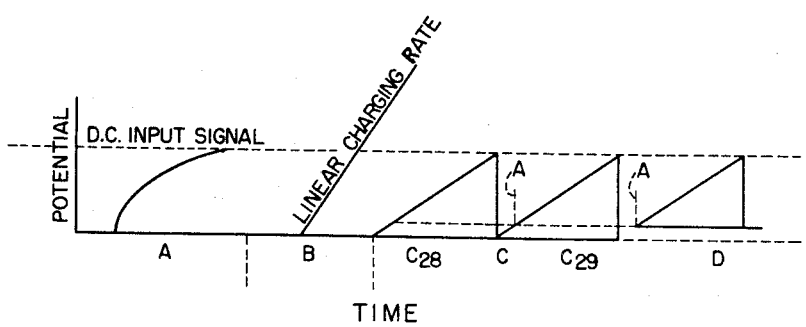
Fig. 3 shows curves illustrating the performance of various RC integrators.

The amplified voltage from the converter 10 changes one of the condensers 28 or 29 to build up a potential on the condensers linearly as indicated by the C curves of Fig. 3. The device of this invention is devised to provide for the conversion of analogue information to digital information. The analogue output voltage of the RC integrator 11 is compared with a reference voltage. The reference voltage, which controls the discharge of the built up potential on the condensers 28 or 29, is the equivalent of the required value of the output integral or analogue voltage to be indicated by one digital pulse. The analogue voltage is the output voltage of the integrator 11 and is the product of the integration. The formula for the integration is as follows:

$$E_0 = \frac{1}{RC}\int E_{in} dt$$

where $E_0$ is the analogue voltage; R is the value of resistance 27; C is the capacitance of either the condensers 28 or 29; and $E_{in}$ is the potential of the voltage from the converter 10. The rising analogue voltage on the condensers 28 or 29 represents the characteristic to be measured by the device of this invention, such as, for example, distance. The reference voltage represents a unit of measure of this characteristic, such as, for example, plus or minus 100 v. D.C. for plus or minus one mile. The amplitude comparator 12 is provided with a dual diode 31 for positive analogue voltage and a dual diode 39 for a negative analogue voltage. Each of the diodes 31 and 39 is held at the reference voltage and will conduct when the analogue voltage output from the integrator 11 reaches the magnitude of this reference voltage. The conduction of the diodes 31 and 39 serves to operate a relay 32, as described in greater detail below, and thus produce digital information. Concomitantly the relay 32 operates to disconnect and discharge the condenser to ground and simultaneously switch the other condenser into the RC integrator circuit of the integrator 11. The points and blades of the condenser circuits may be connected to a conventional selector switch, such as shown and described at page 180 et seq. of the Bell Laboratories Series text entitled, "The Design of Switching Circuits" by Keister, Ritchie and Washburn, copyright, 1951, by D. Van Nostrand Company, Inc., and such switch may be stepped by successive pulses on the coil 32 herein, as stated. This condenser remains in the integrating circuit until its voltage equals that of one of the reference voltages at which point the respective diode conducts, the condenser 28 or 29 is switched out and discharge, as described above in connection with the first-mentioned switching condenser and the first-mentioned switching condenser is switched back into the integrator circuit. It will thus be seen that the integrator 11 and the amplitude comparator 12 serve continuously to integrate the analogue input voltage and generate pulses. The pulses are digital information which are translated to a digital count by the comparator 12.

In the switching and charging up of the condensers 28 or 29, the transfer time from the end of charging of one condenser to the beginning of the charging of the other condenser represents a time during which the latter cannot charge. This represents some loss in the output analogue voltage of the integrator 11.

It is a further feature of this invention that the loss in the output in the integrator 11 between the charging cycles of the alternate switching condensers is obviated by compensating for the unavoidable time delay by providing during the time delay a basic or starting voltage level across the condensers proportioned to the charging rate of the switching condensers during the switch transfer time. This voltage is attained in the device shown and described herein by the use of a center tapped potentiometer 45 which has the potential of a battery 34 connected across it. A potentiometer wiper arm 35 is connected to the shaft 17 of the motor 16, so as to move with the wiper arm 18 on the potentiometer 19. The variations of the wiper arms 18 and 35 are simultaneous in relative signal amplitude. The potentiometer and battery are said to provide the approximate voltage lost during the transfer of the condenser switching relay. Curve D of Fig. 3 indicates the transfer time and compensation voltage in the charging cycle of the switching condensers. Each new charging cycle starts at the point A indicated on the curves C. The profile of the charging cycles of the voltages in the switching condensers are, therefore, as indicated by the curve D.

The output of the D.C. integrator 11 represents a rising voltage level on the switching condensers which is the analogue of some physical characteristic, such as distance. To convert this rising voltage level to a useful quantity, the integrator unit is calibrated so that a given voltage represents an incremental distance. A direct voltage level of this given voltage will cause the diode 31 to conduct and the output of the diode will be a pulse through an output transformer 36 in the amplitude comparator 12. This pulse is amplified in the amplifier 37 which is shown in block diagrammatic form and shaped to operate the relay 32 and the relay 33 which transmits the pulse to the digital counter 13, as indicated in Fig. 1. The diode 31 has a reference voltage applied to its cathode 38. The reference voltage holds the diode 31 from conducting until the output voltage from the integrator 11 matches the reference voltage.

A second diode 39 is also provided. The cathode 41 of this diode 39 is also connected to the D.C. integrator 11. The plate 40 of the diode 39 has a negative reference voltage applied to it. If the output voltage from the D.C. integrator is a negative voltage, then the diode 39 will be caused to conduct and produce a pulse through the amplifier 37 which will cause the counter 13 to count once in a reverse direction or subtract. The second diode section in the dual diodes 31 and 39 is used for correction of contact potential change with heater voltage variation.

The voltage of the condenser 28 or 29 may be a slowly rising D.C. level. Therefore, the diodes will start conducting gradually with a small current and will conduct with a heavier current as the potential from the integrator 11 increases. Therefore, the exact triggering time of the comparator 12 will depend at least partially on the rate of voltage increase of the output voltage. Where the output voltage from the integrator 11 rises at a slow rate due to a low output voltage from the converter 10, the analogue voltage approaches the reference voltage over such a period of time that the moment of triggering may be indefinite. To avoid this uncertainty, means may be provided to cause the diodes 31 and 39 to start conducting suddenly when the integrator output voltage exceeds the positive or negative reference voltage. One means of causing such sudden conduction is the superimposition of a small amplitude wobble voltage on the D.C. output from the integrator 11 through the use of a transformer 42. The transformer 42 applies a 400 cycles per second alternating voltage. This superimposed A.C. signal provides the output voltage from the integrator with a succession of voltage rises. The rising analogue voltage from the integrator, therefore, is modified by a number of intervals of rapidly rising voltage rates. During one of these intervals of rapidly rising voltage rates, the integrator output voltage may exceed the reference voltage and cause the diode 31 or 39 to suddenly commence conducting or abruptly break into conduction as it passes the reference voltage. This is caused by the fact that the analogue voltage from the integrator, having characteristics of a sine wave, reaches the reference voltage on the rise of one of the sine waves. It will be understood that the integrator output voltage may cause the diodes 31 and 39 to conduct without the superimposed alternating voltage.

A modification of the above described embodiment of this invention may provide an apparatus for the A.C. to D.C. conversion by substituting the single potentiometer 19 with a pair of potentiometers. The pair of potentiometers are electrically isolated from each other but have synchronized wiper arms which are mechanically interconnected by suitable means such as a common shaft. One potentiometer has applied to it the alternating potential and the other potentiometer has applied to it the direct potential. The common shaft will cause the motions of the wiper arm on the A.C. potentiometer to be matched in amplitude and direction by the motions of the wiper arm on the D.C. potentiometer. Therefore, any movement of one wiper arm will be reflected in the other and the same polarity and amplitude relationships could be maintained as with the preferred embodiment shown and described herein. The output direct voltage from the converter would be directly proportional to the voltage necessary to buck out single voltage as described above in connection with the converter and shown in the apparatus of Fig. 2. The single potentiometer with superimposed A.C.–D.C. potentials is more advantageous as it eliminates errors which might be introduced by the linearity of dual ganged potentiometers. Also, dual potentiometers would introduce the problem of wiper arm alignment.

In a further modification, a small variable direct potential source 43 may be added to the source of potential 22 and used to correct any change in the value of the potential from the source 22 by the adjustment of a variable resistor 44. This may be desirable as the relationship between the matching pick off alternating voltage and its D.C. counterpart in the potentiometer 19 must be very accurate. The modification with the potential source 43 is not necessary in the case of a well regulated D.C. power supply at 22.

The main advantage of this invention is found in the capacitor switching which allows integration to continue such that extremely large values of the output integral are indicated with a high degree of accuracy. This invention meets the problem of amplifier saturation in the integration of an analogue voltage to digital components through capacitor switching. An additional advantage of this invention is found in the compensating voltage applied to the integrator capacitors during the integrating operation and resultant capacitor switching.

The device of this invention is accurate. Changes in temperature, carrier frequency and input voltage magnitude result in relatively small errors. The components of this device are readily available. As mentioned above, this device may be adapted to measure and record spacial characteristics among other uses.

This device provides extremely high accuracy as the integral is presented in the form of a digital portion plus an analogue portion. Also, the output integral may be recorded on an indicator at extremely removed distances from the signal voltage. This long distance indication and recording is inconvenient or impossible with conventional mechanical devices, such as a motor tachometer.

The above described embodiment is for the purpose of illustration and this invention may be modified and various components of the described apparatus may be individually employed without departure from the scope of the invention which is limited only to the following claims:

What is claimed is:

1. An analog-to-digital conversion system comprising, means responsive to an analog-function alternating voltage having variable amplitude and either of two opposed phase relationships for deriving a unidirectional voltage having a magnitude proportional to the amplitude of said alternating voltage and having a polarity indicative of individual ones of said phase relationships, integrating means having a time constant circuit energized by said unidirectional voltage and which may include either of two condensers charged in response to said unidirectional voltage for integrating said unidirectional voltage between preselected first and second integration voltage limits, means for producing a digital voltage pulse upon completion of each integration between said preselected voltage limits, condenser discharge means, and means responsive to successively developed digital voltage pulses for alternating the use of said condensers in said time constant circuit and for alternating the discharge thereof by said discharge means.

2. An analog-to-digital conversion system in accordance with claim 1 in which said digital voltage responsive means comprises an electromagnetic relay device energized by said digital voltage pulses and including electrical circuit transfer contacts alternated between two transfer positions by said successive digital voltage pulses, said transfer contacts being effective in one transfer position thereof to include one of said condensers in said time constant circuit and concurrently to connect the other of said condensers to said discharge means and being effective in the other of said transfer positions to include said other condenser in said time constant circuit and concurrently to connect said one condenser to said discharge means.

3. An analog-to-digital conversion system comprising, means responsive to an analog-function alternating voltage having variable amplitude and either of two opposed phase relationships for deriving a unidirectional voltage having a magnitude proportional to the amplitude of said alternating voltage and having a polarity indicative of individual ones of said phase relationships; integrating means having a resistive-capacitive time constant circuit which may include as a capacitive component thereof either of two condensers for integrating said unidirectional voltage from a first voltage level, established by the initial charge value of a condenser when included in said time constant circuit, toward a preselected second voltage level; means including unidirectional conductive means having reverse-conductivity bias of said second voltage level value for producing a digital voltage pulse upon completion of each integration to said second voltage level; condenser discharge means for establishing an initial value of charge in each of said condensers; and means responsive to each said digital voltage pulse for removing one of said condensers from said time constant circuit and inserting the other of said condensers therein to initiate a new integration and for concurrently effecting discharge of said one condenser to said initial charge value by said discharge means.

4. An analog-to-digital conversion system according to claim 3 in which said discharge means automatically varies, in magnitude and polarity with the magnitude and polarity of said unidirectional voltage, said initial value of charge established in said condensers.

5. An analog-to-digital conversion system in accordance with claim 3 in which said means for producing said digital pulses includes at least one pair of unidirectional conductive devices connected with opposite polarities to receive the output voltage of said integrating means and individually reverse biased to be rendered individually conductive selectively in accordance with the polarity of said output integration voltage which, according to the polarity of said unidirectional voltage, progresses to corresponding positive and negative polarity values of said second voltage level, and in which said digital pulse producing means produces a positive polarity digital voltage pulse when one of said unidirectional conductive devices becomes conductive and produces a negative polarity digital voltage pulse when the other thereof becomes conductive.

6. An analog-to-digital conversion system according to claim 5 in which said digital voltage producing means includes a transformer having a secondary winding in which said digital voltage pulses are produced and having a primary winding through which the currents of said unidirectional conductive devices flow.

References Cited in the file of this patent

UNITED STATES PATENTS

| | | |
|---|---|---|
| 2,347,529 | Wheeler | Apr. 25, 1944 |
| 2,370,727 | Holden | Mar. 6, 1945 |
| 2,540,310 | Wolf | Feb. 6, 1951 |
| 2,541,093 | Page | Feb. 13, 1951 |
| 2,551,964 | Norton | May 8, 1951 |
| 2,622,231 | Gray | Dec. 16, 1952 |
| 2,668,662 | Roth | Feb. 9, 1954 |
| 2,687,474 | Richmond | Aug. 24, 1954 |
| 2,696,557 | Gray | Dec. 7, 1954 |
| 2,696,582 | Willard | Dec. 7, 1954 |
| 2,717,310 | Woodruff | Sept. 6, 1955 |
| 2,747,094 | Walker | May 22, 1956 |
| 2,891,725 | Blumenthal et al. | June 23, 1959 |

FOREIGN PATENTS

| | | |
|---|---|---|
| 1,079,188 | France | May 19, 1954 |

OTHER REFERENCES

Campbell et al.: "An Electronic Integrating Circuit for Recording the Spontaneous Activity of Animals," Review of Scientific Instruments, vol. 19, No. 11, November 1948, pages 809–811.